Sept. 26, 1950 S. P. LOVELL ET AL 2,523,705
SYNTHETIC WAX OF CARNAUBA TYPE
Filed Feb. 15, 1947
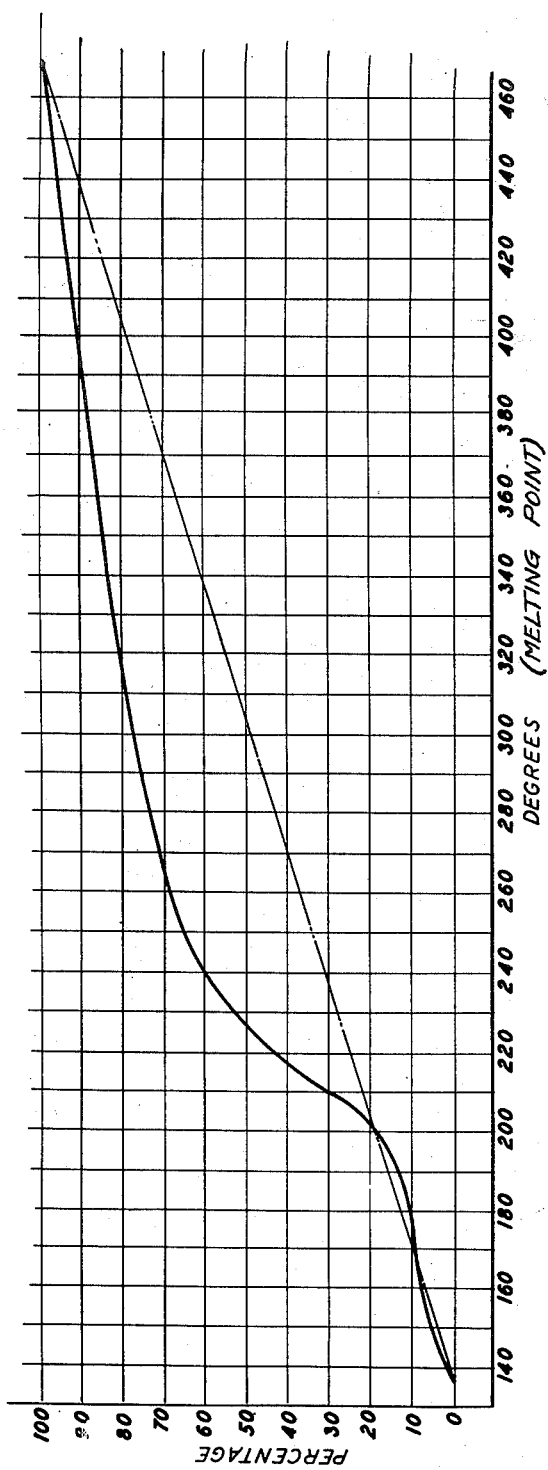
INVENTOR.
Stanley P. Lovell +
BY Harry H. Straw.

Patented Sept. 26, 1950

2,523,705

UNITED STATES PATENT OFFICE 2,523,705

SYNTHETIC WAX OF CARNAUBA TYPE

Stanley P. Lovell, Newtonville, and Harry H. Straw, Arlington, Mass., assignors to Lovell Chemical Company, Watertown, Mass., a corporation of Massachusetts Application February 15, 1947, Serial No. 728,930

2 Claims. (Cl. 260—28.5)

1

This invention consists in a new composition of matter and in one of its forms comprises a wax-like compound useful for coating paper, cloth and other fabrics, or for combining the same.

For many years research and experiment have been directed to find a coating or combining compound having inherent flexibility even at very low temperatures, a moisture vapor resistance approaching that of continuous metal foil, and a viscosity when molten sufficiently high to form a coating film rather than an impregnant which is partially absorbed by the paper or other base fabric.

Our invention is based on the discovery that this long-felt want may be filled by the product of the proper and particular phosphor or solid-solution reaction of paraffin wax and polymerized ethylene. It is stated in the literature that polyethylene has no propensity whatever to tolerate or combine with modifiers or plasticizers, any of which depend on mutual solubility for their action. Specifically, it is said that mixtures of paraffin wax and polyethylene always exhibit incompatibility when cooled to room temperature, the two crystallizing into a mass exhibiting no compromise of the properties of the ingredients in the mixture.

Our research has proved these previous conclusions to be erroneous. On the contrary, we have discovered that by maintaining paraffin wax at a molten temperature of approximately 320° F. and by adding to this molten fluid polymerized ethylene by our novel process, we finally achieve a solid solution of complete compatibility. Its mutuality and integrity is borne out by the fact that repeated re-melts show no crystalline separation upon cooling, and further, that the compound so made is miscible with materials with which neither ingredient alone is compatible. For example, our new compound is compatible with molten anhydrous soap, whereas this is not the case with either paraffin or polyethylene.

The nature and characteristics of our novel compound will be best understood and appreciated from the following illustrative description of the preferred manner of producing it in connection with the accompanying drawings in which the figure is a graphic chart showing actual and theoretical melting points of the composition containing varying proportions of ingredients.

Going more into detail, we first melt a convenient amount of paraffin wax and bring the temperature of the molten mass up to approximately 320° F. We then add a frangible solid polyethylene, breaking it into pieces of convenient size for the quantity being handled. The temperature of the molten mass is maintained at all times and it is subjected to slight agitation until all the polyethylene has become transparent and has lost its natural translucent appearance. At this point in the process agitation is greatly increased and the transparent masses of polyethylene become visibly dispersed in the fluid paraffin. Vigorous agitation is maintained for many hours, at no time allowing the temperature to fall. The apparently homogeneous mass is now sampled, cooled to hardness and examined for crystalline structure formation. Only when no crystals of either ingredient are observed under adequate magnification, for example at X 250, is the heating and agitation discontinued, but when no crystals can be detected in the samples the molten mass is poured in the molds and the solid solution formed.

A satisfactory hypothesis accounting for the novel and valuable results achieved by our process is that the prolonged and controlled treatment of the heated molten mass produces a matrix pattern of polyethylene crystals in which framework the crystals of paraffin are securely captured and permanently held. We are unable to explain why prolonged and violent agitation at or above the critical temperature of approximately 320° F. causes this phenomenon to take place, but it may be that the separate crystal structure previously noted by researchers in this field and the complete lack of modification of each ingredient by the other is overcome by some such factor as fatigue. In any event, the process of our invention results in a new composition of matter in respect to which startling and unexpected results are shown by a study of melting points of the compound made with varying proportions of each ingredient. As more fully illustrating what we mean, we have determined a great many percentage melting points of which the following thirty-four are exemplary and typical. In each case the actual or empirical melting point of the composition has been posted against the theoretical melting point, that is to say, the resultant melting point of each ingredient present in the varying proportions listed.

| Percent Polyethylene | M. P. Empirical °F. | M. P. Theoretical °F. | Variation °F. |
|---|---|---|---|
| 2 | 141.0 | 145.0 | −4.0 |
| 4 | 146.0 | 151.5 | −5.5 |
| 5 | 148.0 | 154.8 | −6.8 |
| 6 | 150.4 | 157.9 | −7.4 |
| 7 | 154.0 | 161.3 | −7.5 |
| 8 | 158.5 | 164.5 | −6.0 |
| 9 | 164.5 | 167.8 | −3.3 |
| 10 | 171.0 | 171.0 | 0.0 |
| 11 | 180.0 | 174.0 | +6.0 |
| 12 | 185.0 | 177.0 | +8.0 |
| 13 | 188.5 | 180.0 | +8.5 |
| 14 | 191.5 | 183.5 | +8.0 |
| 15 | 194.0 | 187.0 | +7.0 |
| 16 | 196.0 | 190.0 | +6.0 |
| 17 | 197.5 | 193.0 | +4.5 |
| 18 | 199.0 | 197.0 | +2.0 |
| 19 | 200.0 | 200.0 | 0.0 |
| 20 | 201.5 | 203.6 | −2.1 |
| 30 | 209.5 | 236.0 | −26.5 |
| 40 | 216.5 | 268.5 | −52.0 |
| 50 | 224.0 | 301.0 | −77.0 |
| 60 | 239.5 | 334.5 | −95.0 |
| 70 | 263.0 | 376.0 | −113.0 |
| 80 | 308.0 | 399.0 | −91.0 |
| 90 | 389.0 | 432.0 | −43.0 |
| 91 | 398.0 | 435.0 | −37.0 |
| 92 | 406.0 | 439.0 | −33.0 |
| 93 | 413.0 | 442.0 | −23.0 |
| 94 | 421.0 | 445.0 | −24.0 |
| 95 | 428.0 | 448.0 | −20.0 |
| 96 | 436.0 | 452.0 | −16.0 |
| 97 | 443.0 | 455.0 | −12.0 |
| 98 | 451.0 | 458.0 | −7.0 |
| 99 | 459.0 | 462.0 | −3.0 |

In the drawings is shown a curve plotted on the above data, the theoretical melting points being shown by the dot and dash line. It shows the expected and normal reverse areas above and below the line of the theoretical until 19% polyethylene and 81% paraffin is reached. At that point the novel and unpredicted nature of our compound becomes apparent. Instead of following the theoretical melting points, the curve departs to a variance of 113° F. maximum below the line of theoretical melting points, and then tends to return to the theoretical more gradually than in its previous departure.

Thus in our novel compound containing between 19% polyethylene and 81% paraffin on the one hand, and 91% polyethylene and 9% paraffin on the other hand, we have produced a demonstrably new compound which is probably a solid solution, that is, aggregates of solute and solvent molecules. Since in the present case both solutes and solvents are crystalline in structure, it appears probable that the crystal of our new compound is of a compromise framework.

The advantages in commercial application already found for this compound tend to substantiate that belief. For example, a compound comprising 30% polyethylene and 70% paraffin and having an empirical melting point of 209.5° F. applied molten to a weight of 9.6 lbs. per ream of paper gives a moisture-vapor transmission factor of .0017. This closely approaches the results obtained heretofore only by the use of a metal foil of virgin run. Again, tested in films of 1/1000 inch in thickness between plates, the selected compound has a breakdown voltage of 722 volts. Were the paraffin uncombined and not permanently locked within the crystalline pattern, the well-known low breakdown voltage of that material as the dominant ingredient would result.

A further characteristic property of our novel compound is that within the 19–91% polyethylene range (the balance paraffin wax) the compound shows no absorption of water by standard A. S. T. M. tests. Below that proportion the compound shows substantially the usual water-absorption characteristics but slightly at variance with those of paraffin wax itself.

A specific example of our new composition of matter and its method of manufacture is as follows: 280 pounds of paraffin wax is heated slowly to a temperature of 320 degrees Fahrenheit at which heat 140 pounds of polyethylene in solid frangible form is introduced into the liquid a little at a time. Mild agitation is employed until the polyethylene becomes transparent and the temperature has returned to 320 degrees F.

When all the polyethylene is transparent and appears softened on its outer surfaces, agitation is violently increased and maintained for four and a half hours. At that time samples are withdrawn and simultaneously tested for viscosity and solid crystal structure. If crystal formation of either paraffin or polyethylene is observed the batch is incomplete. Only when, sometimes after five or more hours of violent agitation, neither crystal structure is present, is the batch judged complete, and the new conjoint crystal established. The molten mass is now poured into molds and allowed to cool to room temperature. The resulting wax contains 33⅓% polyethylene and has an actual melting point of approximately 212° as compared to a theoretical melting point of approximately 248°.

The synthetic wax of our invention is white in color with just a suggestion of a bluish tint and has a specific gravity of 0.915. This compares with the specific gravity of 0.995 of carnauba wax which is the natural wax most closely resembling it in its general properties. Our new wax is violently non-polar, having extremely high electrical insulating value. It breaks with a characteristic conchoidal fracture. It takes an extremely high polish and is not brittle either at moderate temperatures or at temperatures as low as 0° F. In texture its surface is free of tack.

Having thus disclosed our invention and described in detail an illustrative process of producing our novel composition of matter, we claim as new and desire to secure by Letters Patent:

1. The process of making a conjoint crystal of polyethylene and paraffin, which includes the steps of first melting paraffin, heating it to a temperature of approximately 320° F., adding solid frangible polyethylene in the proportions 19–91% polyethylene to 81–9% paraffin, while maintaining the paraffin in slight agitation until the polyethylene loses its natural translucent appearance, at this point greatly increasing agitation of the molten mass, and continuing agitation while maintaining substantially the said temperature until no polyethylene crystals are observable in cooled samples.

2. The process of making a new composition of matter from polyethylene and paraffin, which comprises melting solid frangible polyethylene and paraffin in proportion 19–91% polyethylene to 81–9% paraffin, heating the molten mixture to at least 320° F., maintaining the said temperature for several hours while simultaneously vigorously agitating the mixture until no crystals are observable, and then cooling the mixture thereby producing a whitish wax-like composition having a specific gravity of 0.911.

STANLEY P. LOVELL.
HARRY H. STRAW.

(References on following page)

REFERENCES CITED

The following references are of record in the file of this patent:

UNITED STATES PATENTS

| Number | Name | Date |
|---|---|---|
| 2,298,846 | Skooglund | Oct. 13, 1942 |

OTHER REFERENCES

Irvin, India Rubber World, vol. III, No. 1 (Oct. 1944), pp. 65–66.

Midwinter, British Plastics, May 1945, pp. 208–214 and 228.

Kline, Modern Plastics, May 1946, pp. 141–145, 188, 190 and 192.